(12) United States Patent
Uruma

(10) Patent No.: US 10,027,849 B2
(45) Date of Patent: Jul. 17, 2018

(54) IMAGE FORMING APPARATUS HAVING USER GROUP MANAGEMENT FUNCTION AND CONTROL METHOD THEREFOR, AND STORAGE MEDIUM

(71) Applicant: CANON KABUSHIKI KAISHA, Tokyo (JP)

(72) Inventor: Shuichi Uruma, Kawaguchi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/552,885

(22) Filed: Nov. 25, 2014

(65) Prior Publication Data

US 2015/0146253 A1    May 28, 2015

(30) Foreign Application Priority Data

Nov. 26, 2013 (JP) .................................. 2013-243754

(51) Int. Cl.
*G06F 15/00* (2006.01)
*H04N 1/44* (2006.01)
*H04N 1/00* (2006.01)

(52) U.S. Cl.
CPC ....... *H04N 1/4433* (2013.01); *H04N 1/00832* (2013.01); *H04N 1/4413* (2013.01)

(58) Field of Classification Search
CPC ...... G06Q 10/10; G06Q 10/06; G06Q 10/107; G06Q 10/063112; G06F 17/30011; G06F 17/30221; G06F 17/30; G06F 17/3056; G06F 17/30029; G06F 17/30289; G06F 17/30598; G06F 17/30699; G06F 17/30893; G06F 3/1204; G06F 3/1239; G06F 3/1203; G06F 3/1291; G06F 21/604; G06F 21/6218; G06F 21/6236; G06F 3/1205; G06F 3/1238; G06F 21/629; Y10S 707/99931; Y10S 707/99943; H04L 67/42; H04L 29/08324; H04L 29/08351; H04L 67/1051; H04L 67/1095; H04N 1/00832;

(Continued)

(56) References Cited

U.S. PATENT DOCUMENTS 5,999,766 A * 12/1999 Hisatomi ........... H04N 1/00912
                                                    399/366
6,947,182 B1 * 9/2005 Kumagai ..................... 358/402
(Continued)

FOREIGN PATENT DOCUMENTS

JP    2006-085630 A    3/2006

*Primary Examiner* — Saeid Ebrahimi Dehkordy
(74) *Attorney, Agent, or Firm* — Rossi, Kimms & McDowell LLP

(57) ABSTRACT

An image forming apparatus which can reduce an amount of setting work of an administrator in the image forming apparatus provided with databases for respectively managing a department and a group. A recording unit records the number of printed sheets on a basis of a first group to which a login user belongs in a case where a print process is performed based on a request from the login user. A display unit displays an address book corresponding to a second group to which the login user belongs based on a request to display the address book by the login user. The image forming apparatus switches between managing the first group and the second group as different groups and managing the first group and the second group as the same group.

6 Claims, 14 Drawing Sheets

(58) Field of Classification Search
CPC ........... H04N 1/00509; H04N 1/00511; H04N 1/00514
USPC .... 358/305, 1.13, 1.15, 1.16, 401, 402, 403; 726/4, 7, 17, 21, 27, 28; 399/80, 82, 81, 399/83, 85
See application file for complete search history.

(56) References Cited

U.S. PATENT DOCUMENTS

| | | | | |
|---|---|---|---|---|
| 7,460,806 | B2 * | 12/2008 | Saka | .................. H04L 41/0893 399/80 |
| 7,877,427 | B2 * | 1/2011 | Nakagawa | ............ G06F 3/1222 358/1.13 |
| 8,136,143 | B2 * | 3/2012 | Hannel | ............... H04L 63/0218 370/252 |
| 8,335,797 | B2 * | 12/2012 | Sakai | .................... G06F 3/1207 707/784 |
| 9,013,740 | B2 * | 4/2015 | Fukushima | ........ H04N 1/00411 358/1.15 |
| 2006/0062588 | A1 | 3/2006 | Saka et al. | |

* cited by examiner

FIG. 3A

DEPARTMENT DB 303

| DEPARTMENT ID | PASSCODE | COLOR COPY RESTRICTION ON/OFF | UPPER LIMIT NUMBER OF SHEETS OF COLOR COPY | BLACK-AND-WHITE COPY RESTRICTION ON/OFF | UPPER LIMIT NUMBER OF SHEETS OF BLACK-AND-WHITE COPY |
|---|---|---|---|---|---|
| 0000001 | 1111 | OFF | 0 | OFF | 0 |
| 0000002 | 2222 | ON | 10000 | OFF | 0 |
| 0000003 | 3333 | ON | 10000 | ON | 10000 |
| .. | .. | .. | .. | .. | .. |

FIG. 3B

GROUP DB 305

| GROUP ID | GROUP NAME | ATTRIBUTE NAME | ATTRIBUTE VALUE |
|---|---|---|---|
| gxxxx | groupA | Group | groupA |
| gyyyy | groupB | Group | groupB |
| gzzzz | groupC | Group | groupC |
| .. | .. | .. | .. |

FIG. 3C

USER DB
307

| USER ID | USER NAME | PASSWORD | DEPARTMENT ID | ATTRIBUTE VALUE |
|---------|-----------|----------|---------------|-----------------|
| uxxxx   | userA     | aaaa     | 0000001       | groupA          |
| uyyyy   | userB     | bbbb     | 0000002       | groupB          |
| uzzzz   | userC     | cccc     | 0000003       | groupC          |
| :       | :         | :        | :             | :               |

FIG. 3D

DEPARTMENT/GROUP COORDINATION MODE SETTINGS
315

| DEPARTMENT/GROUP COORDINATION MODE |
|------------------------------------|
| ON                                 |

FIG. 3E

USER ATTRIBUTE INFORMATION
316

| USER NAME | DEPARTMENT ID | ATTRIBUTE VALUE |
|-----------|---------------|-----------------|
| userA     | 0000001       | groupA          |

| GROUP ID | GROUP NAME | ATTRIBUTE NAME | ATTRIBUTE VALUE |
|---|---|---|---|
| gxxxx | 0000001 | DeptID | 0000001 |
| gyyyy | 0000002 | DeptID | 0000002 |
| gzzzz | 0000003 | DeptID | 0000003 |
| : | : | : | : |

| USER ID | USER NAME | PASSWORD | DEPARTMENT ID | ATTRIBUTE VALUE |
|---|---|---|---|---|
| uxxxx | userA | aaaa | 0000001 | - |
| uyyyy | userB | bbbb | 0000002 | - |
| uzzzz | userC | cccc | 0000003 | - |
| : | : | : | : | : |

| USER NAME | DEPARTMENT ID | ATTRIBUTE VALUE |
|---|---|---|
| userA | 0000001 | 0000001 |

*FIG. 6A*

USER NAME : userA
GROUP : groupA

| NAME | TELEPHONE NUMBER |
|---|---|
| ADDRESS 1 | XXXXXXXXXX |
| ADDRESS 2 | YYYYYYYYYY |
| ADDRESS 3 | ZZZZZZZZZZ |
| | |

[CANCEL]   [OK]

*FIG. 6B*

USER NAME : userA
GROUP : 0000001

| NAME | TELEPHONE NUMBER |
|---|---|
| ADDRESS 1 | XXXXXXXXXX |
| ADDRESS 2 | YYYYYYYYYY |
| ADDRESS 3 | ZZZZZZZZZZ |
| | |

[CANCEL]   [OK]

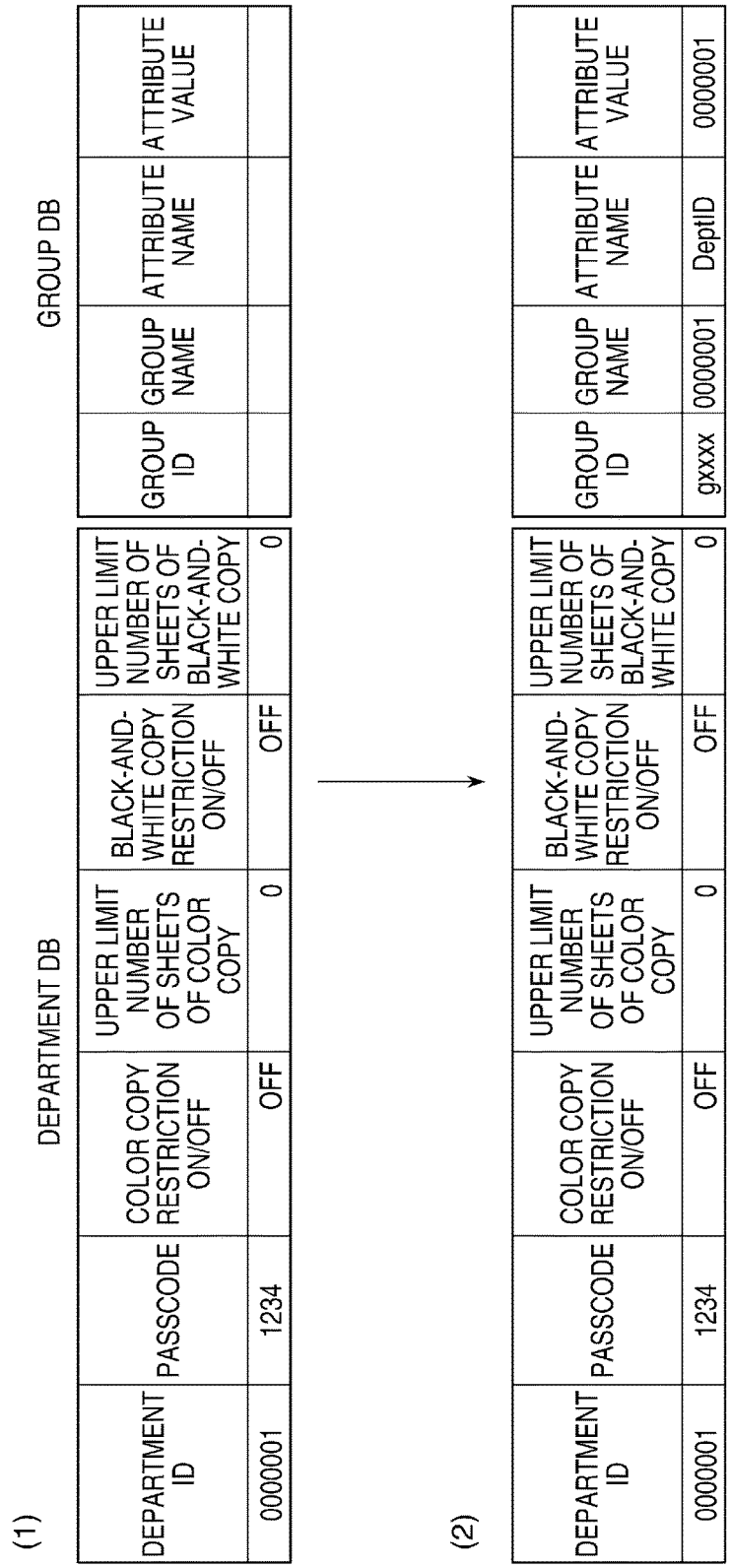

IMAGE FORMING APPARATUS HAVING USER GROUP MANAGEMENT FUNCTION AND CONTROL METHOD THEREFOR, AND STORAGE MEDIUM

BACKGROUND OF THE INVENTION

Field of the Invention

The present invention relates to an image forming apparatus and a control method therefor, and a storage medium.

Description of the Related Art

There is a known image forming apparatus (hereinafter, referred to as an MFP (Multi Function Peripheral)) which includes an image reading unit, a printing unit, an image storage unit and a communication unit, and which has image processing application such as copy, printing, scanning and FAX transmission/reception.

The MFP commonly has a function of recording the number of printed sheets for each department to which a user executing a function of copy, or the like, belongs.

The recorded number of printed sheets is utilized for billing or management of an upper limit of the number of printed sheets for each department. Therefore, the MFP assigns one user ID to one user, assigns a unique department ID to each department, and associates the user IDs with the department IDs. That is, users are classified and managed for each department.

In recent years, there have been increased cases where, in information equipment including an MFP, a concept of a group is introduced as a mechanism for classifying users, separately from the above-described department.

As an example of use of a group, a function of changing a printing method among black-and-white printing, color printing, and the like, according to a group to which a user belongs has been proposed (see, for example, Japanese Laid-Open Patent Publication (Kokai) No. 2006-85630).

As another example of use of a group, a function has been proposed in which an address book which stores FAX transmission destination telephone numbers is created for each group, and a user is allowed to use only the address book of the group to which the user belongs . While the group is similar to the department in that users are classified into a certain category, software for the department and the group is implemented separately because of the following reasons.

First, the department is often utilized as a category in an organization, while the group is often utilized as a category for each purpose of business or for each post. Further, the MFP has properties that a product is developed by expanding a function while inheriting the old function, while reflecting demands of customers of the market. Therefore, when a function relating to the group is newly added, it is preferable to employ a system in which the group is introduced separately from the department so as not to affect implementation of software relating to an existing department.

Based on such background, there now exists two grouping methods of a department and a group in one MFP, and databases for storing data corresponding to the respective groupings are independently prepared.

However, with the group management method proposed in Japanese Laid-Open Patent Publication (Kokai) 2006-85630, the following problem occurs when the department and the group are made to coexist.

For example, in small companies, because posts are not minutely hierarchized, it is not necessary to classify users for each post, and it is only necessary to classify users for each department. That is, there is a case where it is desired to use the both functions of the department and the group while performing grouping using only the department according to an operation environment.

In such an operation environment, because an administrator needs to perform setting for each of the department and the group although grouping is performed using only the department, the administrator has to set the group which would not have been required, which causes a problem that the amount of setting work of the administrator increases.

SUMMARY OF THE INVENTION

The present invention provides an image forming apparatus which can reduce an amount of setting work of an administrator in the image forming apparatus provided with databases for respectively managing a department and a group, and a control method thereof, and a storage medium.

Accordingly, a first aspect of the present invention provides an image forming apparatus comprising a recording unit configured to record the number of printed sheets on a basis of a first group to which a login user belongs in a case where a print process is performed based on a request from the login user, and a display unit configured to display an address book corresponding to a second group to which the login user belongs based on a request to display the address book by the login user, wherein the image forming apparatus switches between managing the first group and the second group as different groups and managing the first group and the second group as the same group.

Accordingly, a second aspect of the present invention provides a control method for an image forming apparatus, comprising a recording step of recording the number of printed sheets on a basis of a first group to which a login user belongs in a case where a print process is performed based on a request from the login user, and a display step of displaying an address book corresponding to a second group to which the login user belongs based on a request to display the address book by the login user, wherein the image forming apparatus can switch between managing the first group and the second group as different groups and managing the first group and the second group as the same group.

Accordingly, a second aspect of the present invention provides a non-transitory computer-readable storage medium storing a program for causing a computer to execute a control method for an image forming apparatus, the control method comprising a recording step of recording the number of printed sheets on a basis of a first group to which a login user belongs in a case where a print process is performed based on a request from the login user, and a display step of displaying an address book corresponding to a second group to which the login user belongs based on a request to display the address book by the login user, wherein the image forming apparatus can switch between managing the first group and the second group as different groups and managing the first group and the second group as the same group.

According to the present invention, when a department ID is created, a record having the created department ID is added to a department database, and a record having the created department ID as a group name is added to a group database. By this means, it is possible to automatically set the group database in conjunction with setting work of the department database, which eliminates the need of setting work of the group database. As a result, it is possible to reduce an amount of setting work of an administrator.

Further features of the present invention will become apparent from the following description of exemplary embodiments (with reference to the attached drawings).

BRIEF DESCRIPTION OF THE DRAWINGS

FIG. 3A to FIG. 3E are diagrams showing various DBs and information stored in an HDD or a RAM in FIG. 2.

FIG. 4A to FIG. 4C are diagrams showing a group DB, a user DB and user attribute information in which information different from FIG. 3B, FIG. 3C and FIG. 3E is stored.

FIG. 6A and FIG. 6B are diagrams showing address books displayed at an operating unit in FIG. 2.

FIG. 7 is a diagram showing a change of each DB through department ID addition processing.

DESCRIPTION OF THE EMBODIMENTS

An embodiment of the present invention will be described below with reference to the drawings.

Figure 1:
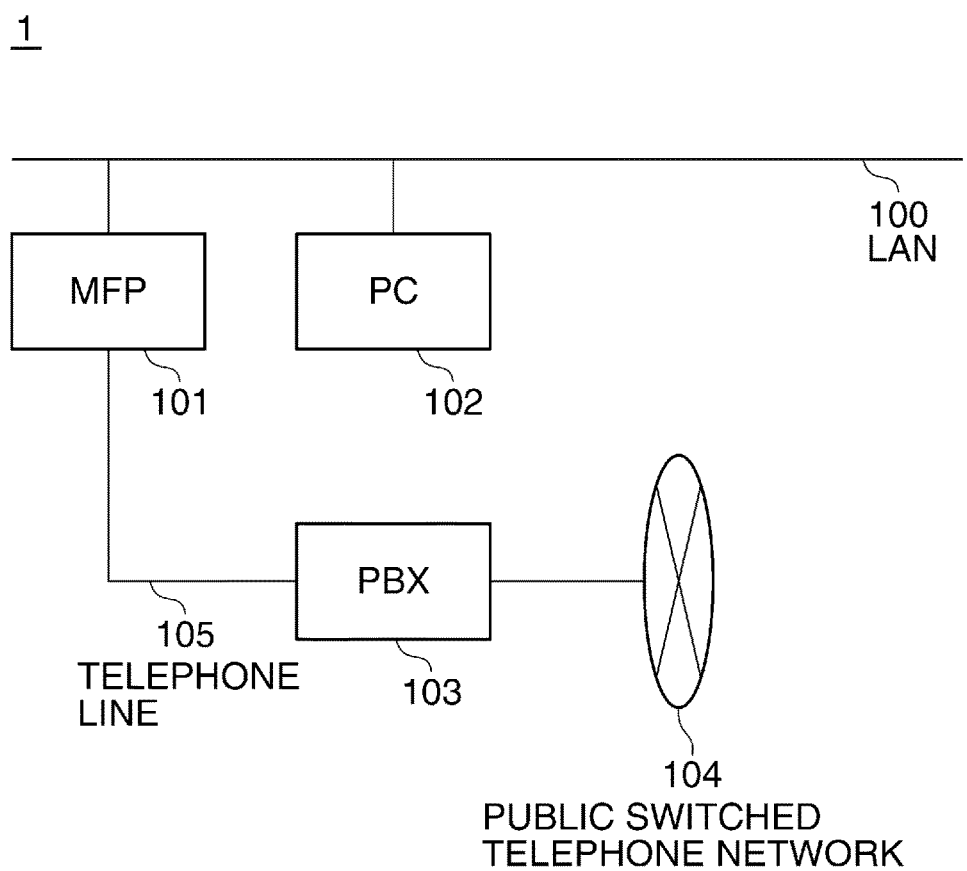
FIG. 1 is a diagram showing a schematic configuration of an image forming system according to an embodiment of the present invention.

FIG. 1 is a diagram showing a schematic configuration of an image forming system 1 according to the embodiment of the present invention.

In FIG. 1, the image forming system 1 is composed of an MFP 101, a PC 102 and a PBX 103 (Private Branch eXchange). The MFP 101 is connected to the PC 102 via a LAN 100, and the MFP 101 is connected to the PBX 103 via a telephone line 105, and the PBX 103 is connected to a public switched telephone network 104.

The MFP 101 which is an image forming apparatus, performs processing relating to image formation, such as copy, scanning and FAX. The MFP 101 according to the present embodiment performs printing based on a printing request from the PC 102, or transmits or receives FAX to and from an external apparatus via the PBX 103. It should be noted that the MFP 101 may be configured to be directly connected to the public switched telephone network 104.

Figure 2:
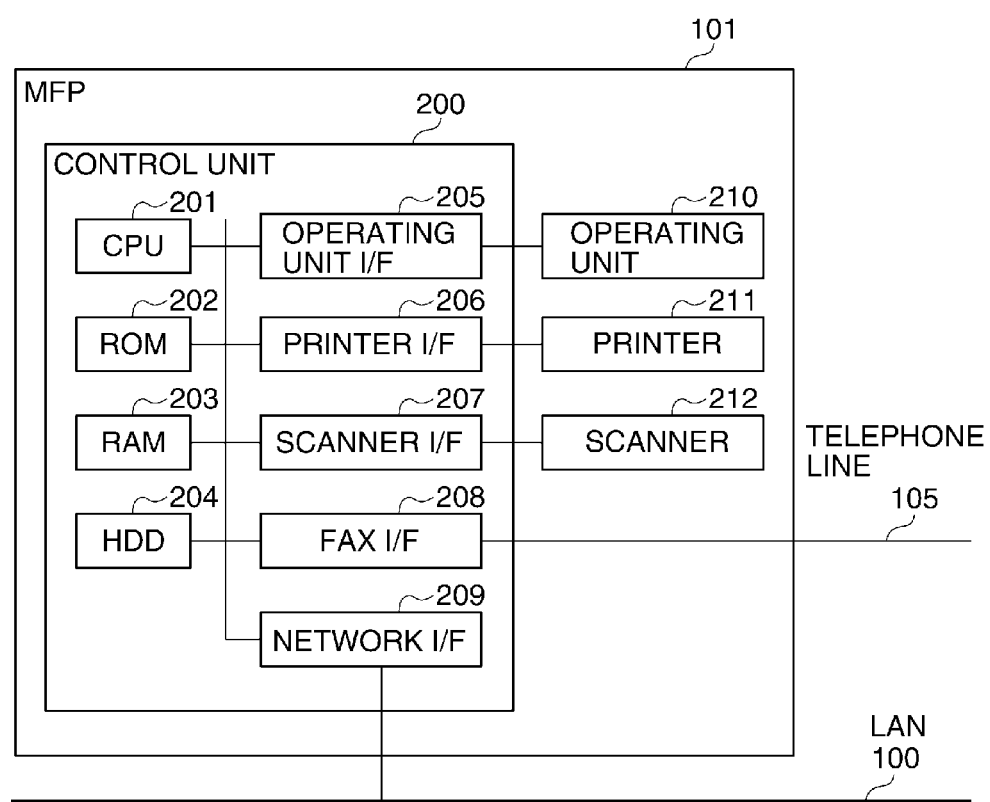
FIG. 2 is a diagram schematically showing a hardware configuration of an MFP in FIG. 1.

FIG. 2 is a diagram schematically showing a hardware configuration of the MFP 101 in FIG. 1.

In FIG. 2, the MFP 101 is composed of a control unit 200, an operating unit 210, a printer 211 and a scanner 212.

The control unit 200 controls the whole of the MFP 101. The operating unit 210 accepts an operation from the user or displays information to the user. The printer 211 forms an image on a recording medium such as paper. The scanner 212 generates image data by reading a document.

Further, the control unit 200 is composed of a CPU 201, a ROM 202, a RAM 203, an HDD 204, an operating unit interface 205, a printer interface 206, a scanner interface 207, a FAX interface 208 and a network interface 209, which are connected to one another via a bus.

The CPU 201 controls the whole of the MFP 101 via the control unit 200. The ROM 202 is a non-volatile storage unit which stores various programs such as a boot program.

The RAM 203 which is used as a working area of the CPU 201, is a volatile storage unit which stores various programs, various data, or the like. The HDD 204 is a non-volatile storage unit which stores various programs, various data, various databases which will be described later (hereinafter, referred to as DBs), or the like. The flowchart which will be described later is executed by the program stored in the ROM 202 being extracted to the RAM 203 and the extracted program being executed by the CPU 201.

The operating unit interface 205 is an interface between the control unit 200 and the operating unit 210. The printer interface 206 is an interface between the control unit 200 and the printer 211. The scanner interface 207 is an interface between the control unit 200 and the scanner 212.

The FAX interface 208 is an interface for connecting to the telephone line 105 to transmit and receive various data through a FAX. The network interface 209 is an interface for connecting to the LAN 100 to transmit and receive data according to various communication protocols.

FIG. 3A to FIG. 3E are diagrams showing various DBs and information stored in the HDD 204 or the RAM 203 in FIG. 2.

FIG. 3A is a diagram showing a department DB 303. In FIG. 3A, items of the department DB 303 include a department ID, a passcode, color copy restriction, an upper limit number of sheets of color copy, black-and-white copy restriction and an upper limit number of sheets of black-and-white copy. In this way, the department DB 303 is a database for managing image processing executed by a user belonging to a certain department.

The department ID is an ID uniquely assigned to each department. The passcode is assigned to each department. The color copy restriction is indicated by ON/OFF, and ON indicates that color copy is possible, while OFF indicates that color copy is not possible. The upper limit number of sheets of color copy indicates an upper limit of the number of sheets of color copy.

The black-and-white copy restriction is indicated by ON/OFF, and ON indicates that black-and-white copy is possible, while OFF indicates that black-and-white copy is not possible. The upper limit number of sheets of black-and-white copy indicates an upper limit of the number of sheets of black-and-white copy.

It should be noted that the department is often utilized as a category in the organization, and, examples of the department in the present embodiment include departments in a typical corporate organization, such as a unit, a section, a department, a headquarter, a main office, a branch office, a branch and a sales office.

FIG. 3B shows a group DB 305 for managing a group different from the department described in FIG. 3A. In FIG. 3B, items of the group DB 305 are comprised of a group ID, a group name, an attribute name and an attribute value.

The group ID is an ID uniquely assigned to each group. The group name indicates a name of the group. The attribute name indicates a name of an attribute indicating which category the user belongs to. If the attribute is a group, the attribute name is "Group" as indicated in FIG. 3B, and if the attribute is a department, the attribute name is "DeptID".

The attribute value is a value of an attribute, and, for example, if the attribute is a group, the attribute value is "groupA" as indicated in FIG. 3B.

As described above, the MFP 101 according to the present embodiment includes databases for respectively managing the department and the group.

It should be noted that the group is often utilized as a category for each purpose of business or for each post, and examples of the group in the present embodiment include a project team, part within the department, a team of human resources collected across a plurality of departments, or the like.

That is, the department is different from the group, and data for managing the department is different from data for managing the group. Therefore, the department DB 303 and the group DB 305 cannot be integrated into one database, and are thus managed as independent databases.

FIG. 3C shows a user DB 307. In FIG. 3C, items of the user DB 307 are comprised of a user ID, a user name, a password, a department ID and an attribute value.

The user ID is an ID uniquely assigned to each user. The user name indicates a name of the user. The password indicates a password used by the user to log into the MFP 101. The department ID indicates an ID of the department to which the user belongs. The attribute value indicates an attribute value of the group to which the user belongs.

FIG. 3D shows department/group coordination mode setting 315 which is provided in the HDD 204 and stored in a mode setting area 309 which will be described later. The department/group coordination mode is a mode for implementing synchronization processing for coordinating the department with the group, which will be described later, and, if the department/group coordination mode is ON, the department/group coordination mode is enabled, while if the department/group coordination mode is OFF, the department/group coordination mode is not enabled.

FIG. 3E shows user attribute information 316 stored in a user attribute area 312 which is provided in the RAM 203 and which will be described later. The user attribute information 316 is comprised of a user name, a department ID and an attribute value. The attribute value described here indicates an attribute value of the group to which the user belongs. Further, the user attribute information 316 is created when the user logs into the MFP 101.

FIG. 4A to FIG. 4C are diagrams showing various DBs and information when the department/group coordination mode setting 315 is ON, and show an example where information different from the information indicated in FIG. 3B, FIG. 3C and FIG. 3E is stored in the group DB 305 of FIG. 3B, the user DB 307 of FIG. 3C and the user attribute information 316 of FIG. 3E.

In FIG. 4A, a group name, an attribute name and an attribute value different from those in FIG. 3B are set in the group DB 305. Specifically, the department ID is set at the group name and the attribute value, and, instead of "Group", "DeptID" is set at the attribute name.

In FIG. 4B, an attribute value is not set in the user DB 307. An administrator of the MFP 101 can set an attribute value through processing which will be described later.

In FIG. 4C, an attribute value different from that of FIG. 3E is set at the user attribute information 316. Specifically, instead of "groupA", department ID "0000001" is set at the attribute value.

Figure 5:
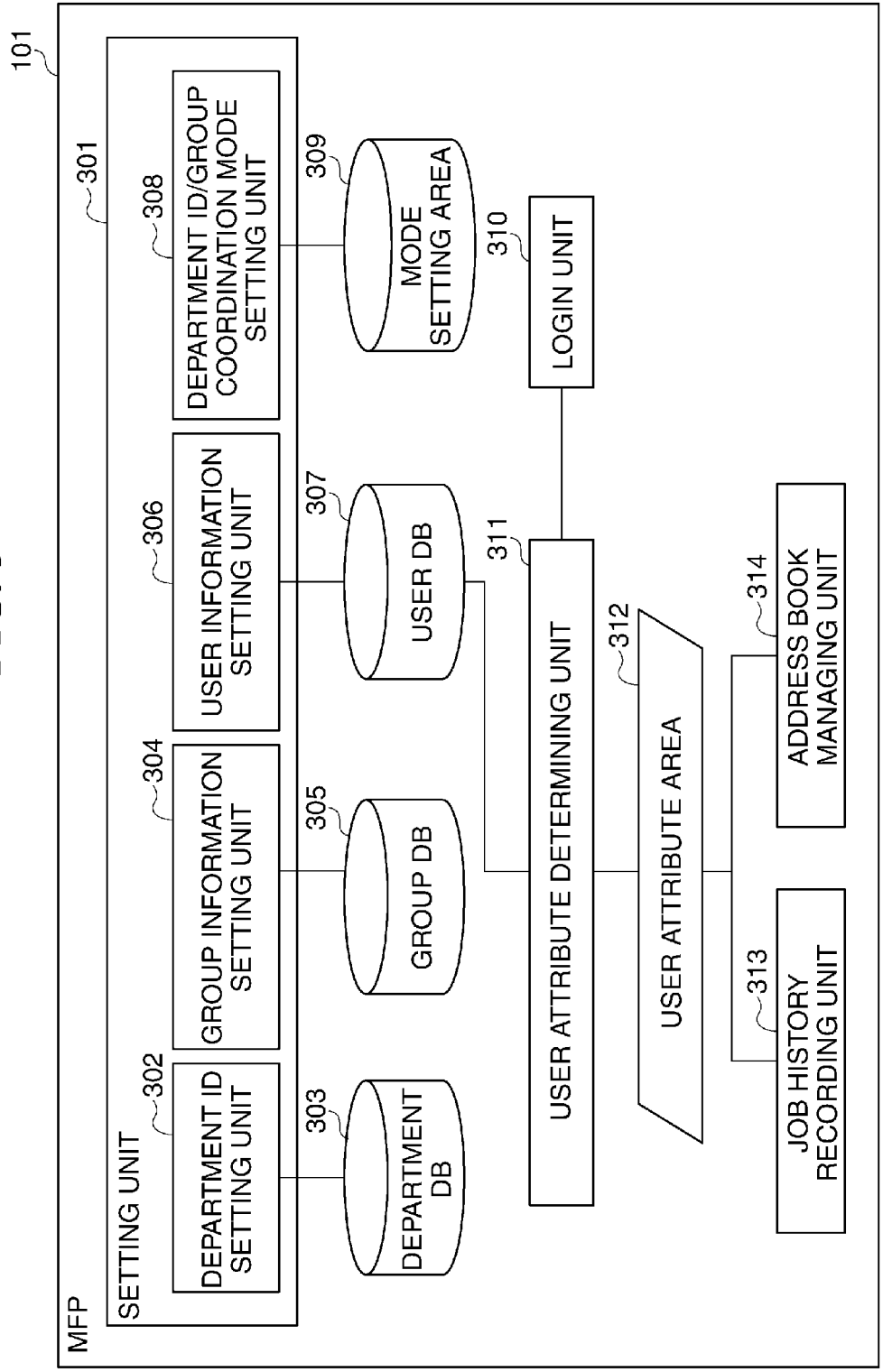
FIG. 5 is a diagram schematically showing a software configuration of the MFP in FIG. 1.

FIG. 5 is a diagram schematically showing a software configuration of the MFP 101 in FIG. 1.

In FIG. 5, the software configuration of the MFP 101 includes a setting unit 301, a user attribute determining unit 311, a login unit 310, a job history recording unit 313 and an address book managing unit 314. Programs of the software are stored in the ROM 202.

The setting unit 301 displays a setting screen on a Web browser which operates in the operating unit 210 or the PC 102, and allows the administrator of the MFP 101 to perform various setting changes regarding the operation of the MFP 101. While various settings are made to the MFP 101, only settings relating to the present embodiment will be described here.

The setting unit 301 includes a department ID setting unit 302, a group information setting unit 304, a user information setting unit 306 and a department ID/group coordination mode setting unit 308.

Among these units, the department ID setting unit 302 performs processing relating to the settings of the department ID and manages the department DB 303 shown in FIG. 3A. The group information setting unit 304 performs processing relating to the settings of the group information and manages the group DB 305 shown in FIG. 3B.

The user information setting unit 306 performs processing relating to the settings of the user information and manages the user DB 307 shown in FIG. 3C. The department ID/group coordination mode setting unit 308 performs processing relating to the department/group coordination mode setting 315 shown in FIG. 3D and stores the settings in the mode setting area 309.

The login unit 310 performs processing relating to login of the user. Specifically, the login unit 310 displays a login screen at the operating unit 210 and encourages the user to input the user ID and the password. If the input ID and password match any user information stored in the user DB 307, the login unit 310 judges the user who has input the ID and the password as an authorized user, and displays an operation screen to enable the user to utilize the MFP 101 on the operating unit 210.

If the user attribute determining unit 311 is notified of completion of login of the user from the login unit 310, the user attribute determining unit 311 acquires a user attribute of the user who has performed login from the user DB 307, creates the user attribute information 316 shown in FIG. 3E and stores the user attribute information 316 in the user attribute area 312.

It should be noted that instead of the user attribute determining unit 311 acquiring the user attribute from the user DB 307, the login unit 310 may acquire the user attribute from the user DB 307 and pass the user attribute to the user attribute determining unit 311.

The job history recording unit 313 records a job history in the HDD 204 when the user performs printing, or the like. At this time, the job history recording unit 313 records the department ID of the user by referring to the user attribute information 316 stored in the user attribute area 312 in order to record the department of the user who has performed operation. This job history can be utilized, for example, when billing is performed for each department ID.

The address book managing unit 314 displays only the address book of the group to which the user belongs on the operating unit 210 when the user performs operation of displaying the address book.

FIG. 6A and FIG. 6B are diagrams showing the address books displayed on the operating unit 210 in FIG. 2.

FIG. 6A is a diagram showing an address book displayed when the department ID/group coordination mode is OFF. FIG. 6A shows an example of an address book for "groupA" displayed when settings is applied so that user A belongs to "groupA".

FIG. 6B shows an address book displayed when the department ID/group coordination mode is ON. FIG. 6B shows an example of an address book for group name "0000001" displayed when department ID "0000001" is set at the group name of "userA".

Each processing of group management according to the present embodiment performed through the configuration as described above will be described. First, summary of department ID addition processing, department ID deletion processing and synchronization processing will be described.

FIG. 7 is a diagram showing a change of each DB when the department ID addition processing is executed.

In FIG. 7, if the administrator adds a record having the department ID "0000001" in the department DB 303 ((1) in FIG. 7), the record is added to the group DB 305 ((2) in FIG. 7). At this time, the same value as the department ID added to the department DB 303 is set at the group name and the attribute value of the added group, and "DeptID" indicating the department ID is set at the attribute name.

Figure 8:
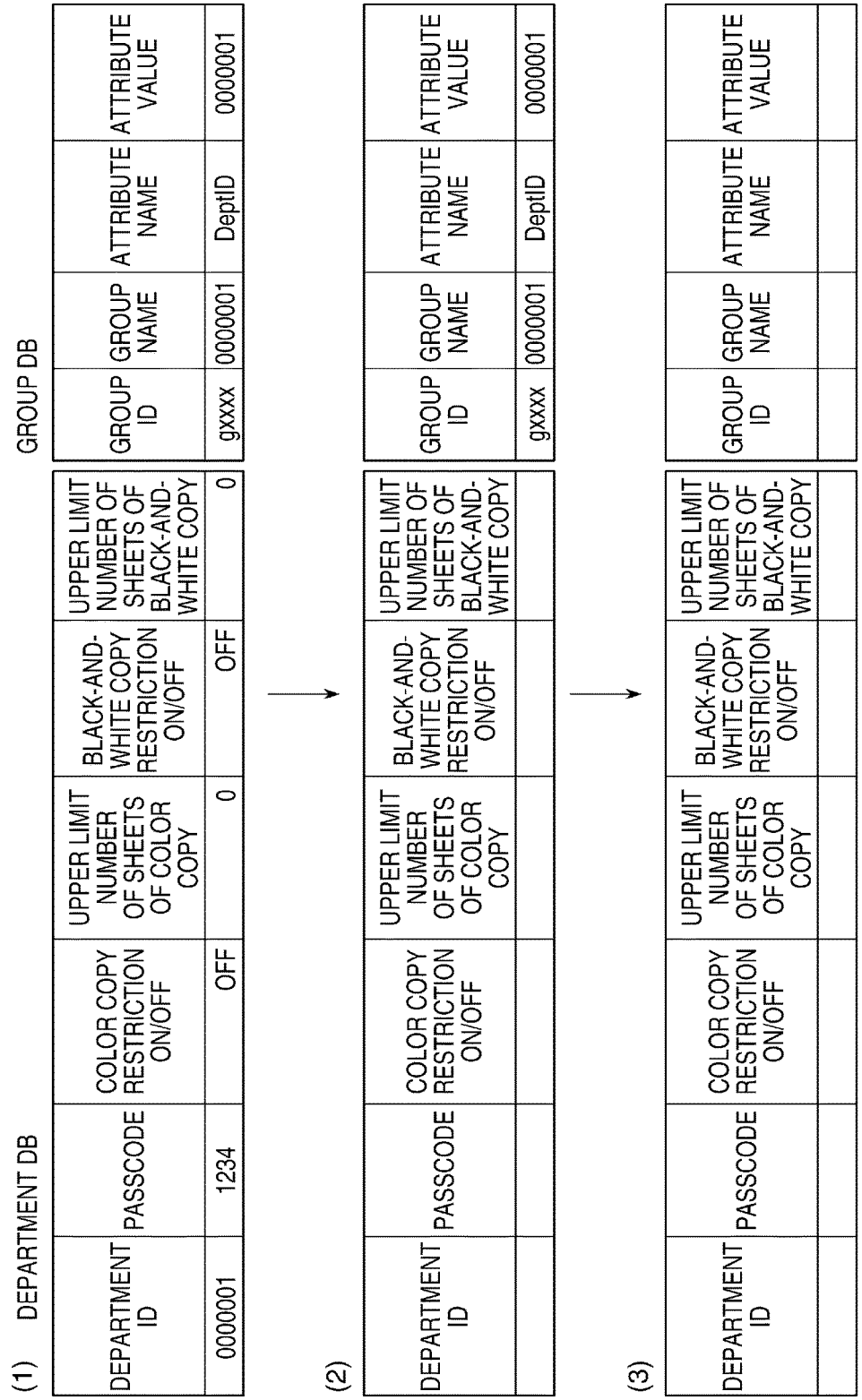
FIG. 8 is a diagram showing a change of each DB through department ID deletion processing.

FIG. 8 is a diagram showing a change of each DB when the department ID deletion processing is executed.

In FIG. 8, if, in a state where each information of department ID "0000001" is recorded in the department DB 303 ((1) in FIG. 8), a record having the department ID "0000001" is deleted from the department DB 303 by the administrator ((2) in FIG. 8), a record of a group having the same group name and attribute value is deleted from the group DB 305 ((3) in FIG. 8).

Figure 9:
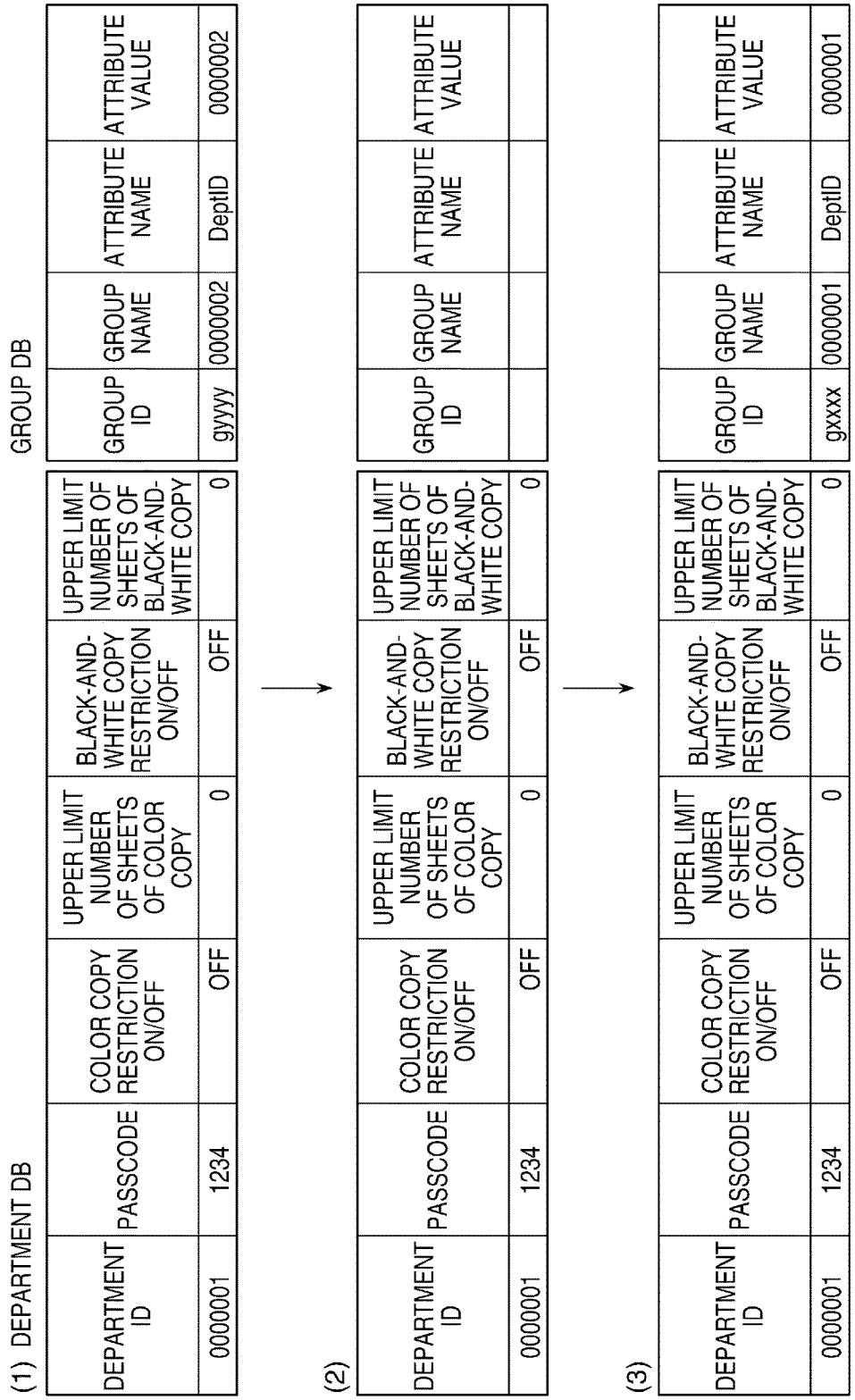
FIG. 9 is a diagram showing a change of each DB through synchronization processing.

FIG. 9 is a diagram showing a change of each DB when the synchronization processing is executed.

In the present embodiment, while there is always a one-to-one correspondence relation between the department ID and the group, there is a case where this correspondence relation between the department ID and the group is lost for some reasons. The synchronization processing is executed for addressing inconsistency due to the loss of the correspondence relation.

Examples of loss of the correspondence relation include a case where although there is a record having the department ID "0000001" in the department DB 303, there is no record whose attribute value is "0000001" in the group DB 305. Further, the reasons why the correspondence relation is lost include disconnection of power supply to the MFP 101 during the department ID creation processing.

It should be noted that while the synchronization processing is executed when the administrator displays a management screen of the department ID in the present embodiment, a timing for executing the synchronization processing is not limited to this.

It is assumed in FIG. 9 that in a state where each information of department ID "0000001" is recorded in the department DB 303, and, further, a group of attribute value "0000002" is recorded in the group DB 305 ((1) in FIG. 9), the administrator displays the management screen.

At this time, the department ID recorded in the department DB 303 is different from the group name and the attribute value recorded in the group DB 305. That is, the correspondence relation between them is lost. To address this loss of the correspondence relation, a record having the attribute value "0000002" is deleted from the group DB 305 ((2) in FIG. 9), and a record having the same group name and attribute value "0000001" as the department ID "0000001" of the department DB 303 is created in the group DB 305 ((3) in FIG. 9).

As described above, in the present embodiment, if a record having the department ID present in the department DB 303 is not present in the group DB 305, a record having the department ID present in the department DB is added to the group DB 305.

Figure 10:
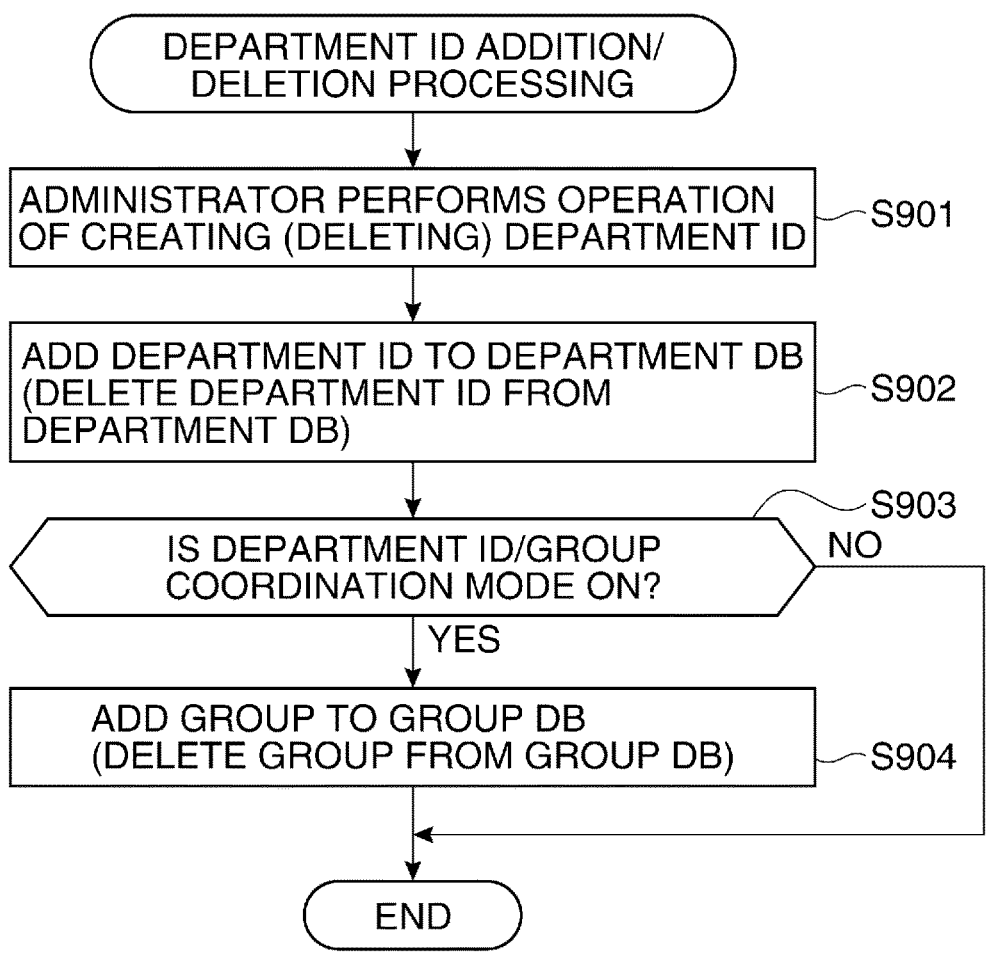
FIG. 10 is a flowchart showing a procedure of the department ID addition/deletion processing executed by a CPU in FIG. 2.

FIG. 10 is a flowchart showing a procedure of department ID addition processing and deletion processing executed by the CPU 201 in FIG. 2. It should be noted that in FIG. 10, the deletion processing is indicated in brackets, in addition to the addition processing.

In FIG. 10, the administrator performs operation of creating a department ID through the department ID management screen (step S901). In the case of the deletion processing, in step S901, the administrator performs operation of deleting a department ID.

Next, as shown in FIG. 7, the CPU 201 adds a record having a department ID created in the department DB 303 by the department ID setting unit 302 (step S902). In the case of the deletion processing, in step S902, the CPU 201 deletes a record having a department ID to be deleted from the department DB 303 by the department ID setting unit 302 as shown in FIG. 8.

Subsequently, the CPU 201 judges whether or not the stored department/group coordination mode setting 315 is ON with reference to the mode setting area 309 (step S903).

As a result of the judgment in step S903, if the department/group coordination mode setting 315 is OFF (No in step S903), the CPU 201 ends the processing.

Meanwhile, as a result of the judgment in step S903, if the department/group coordination mode setting 315 is ON (Yes in step S903), the CPU 201 adds a record having the same department ID as the group and the attribute as that in the record added to the department DB 303 in step S902 to the group DB 305 by the group information setting unit 304 (step S904), and ends the processing. In the case of the deletion processing, the CPU 201 deletes a record having the same group name and attribute as the department ID included in the record deleted in step S902 from the group DB 305 by the group information setting unit 304 as shown in FIG. 8 and ends the processing.

Figure 11:
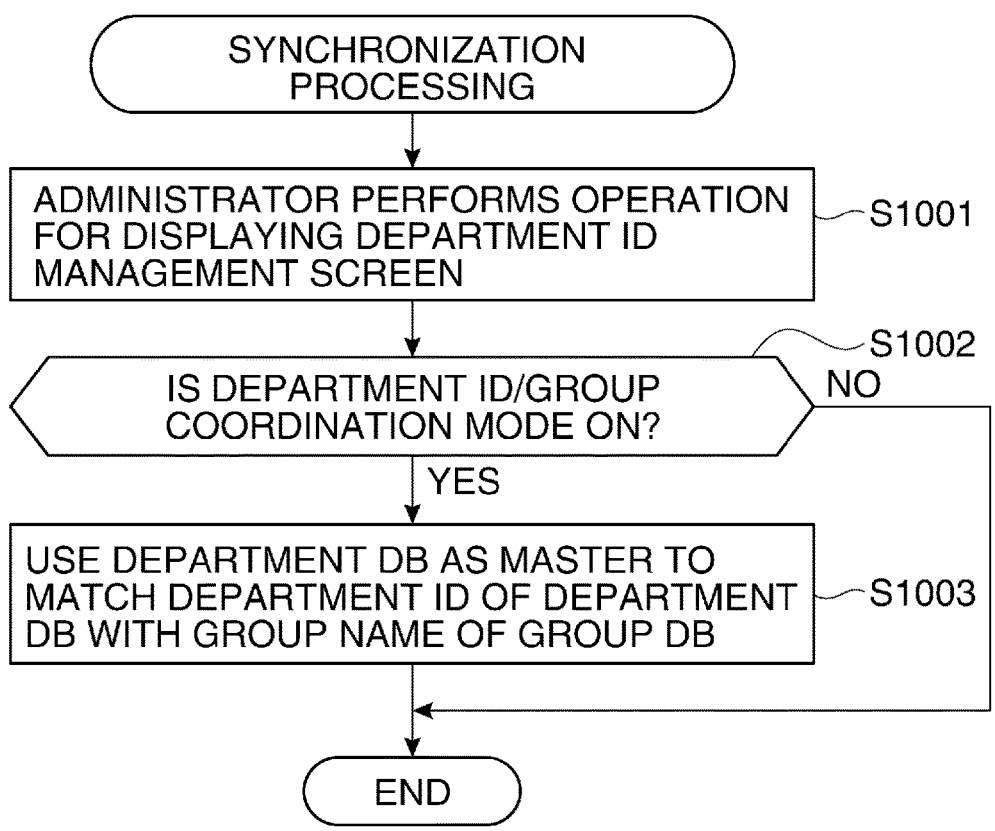
FIG. 11 is a flowchart showing a procedure of the synchronization processing executed by the CPU in FIG. 2.

FIG. 11 is a flowchart showing a procedure of the synchronization processing executed by the CPU 201 in FIG. 2.

In FIG. 11, if the administrator performs operation of displaying the department ID management screen (step S1001), the CPU 201 judges whether or not the stored department/group coordination mode setting 315 is ON with reference to the mode setting area 309 (step S1002).

As a result of the judgment in step S1002, if the department/group coordination mode setting 315 is OFF (No in step S1002), the CPU 201 ends the processing.

Meanwhile, as a result of the judgment in step S1002, if the department/group coordination mode setting 315 is ON (Yes in step S1002), the CPU 201 uses the department DB 303 as a master as shown in FIG. 9 to match the department ID present in the department DB 303 with the group name and the attribute value of the record in the group DB 305 by the group information setting unit 304 (step S1003) and ends the processing.

Figure 12:
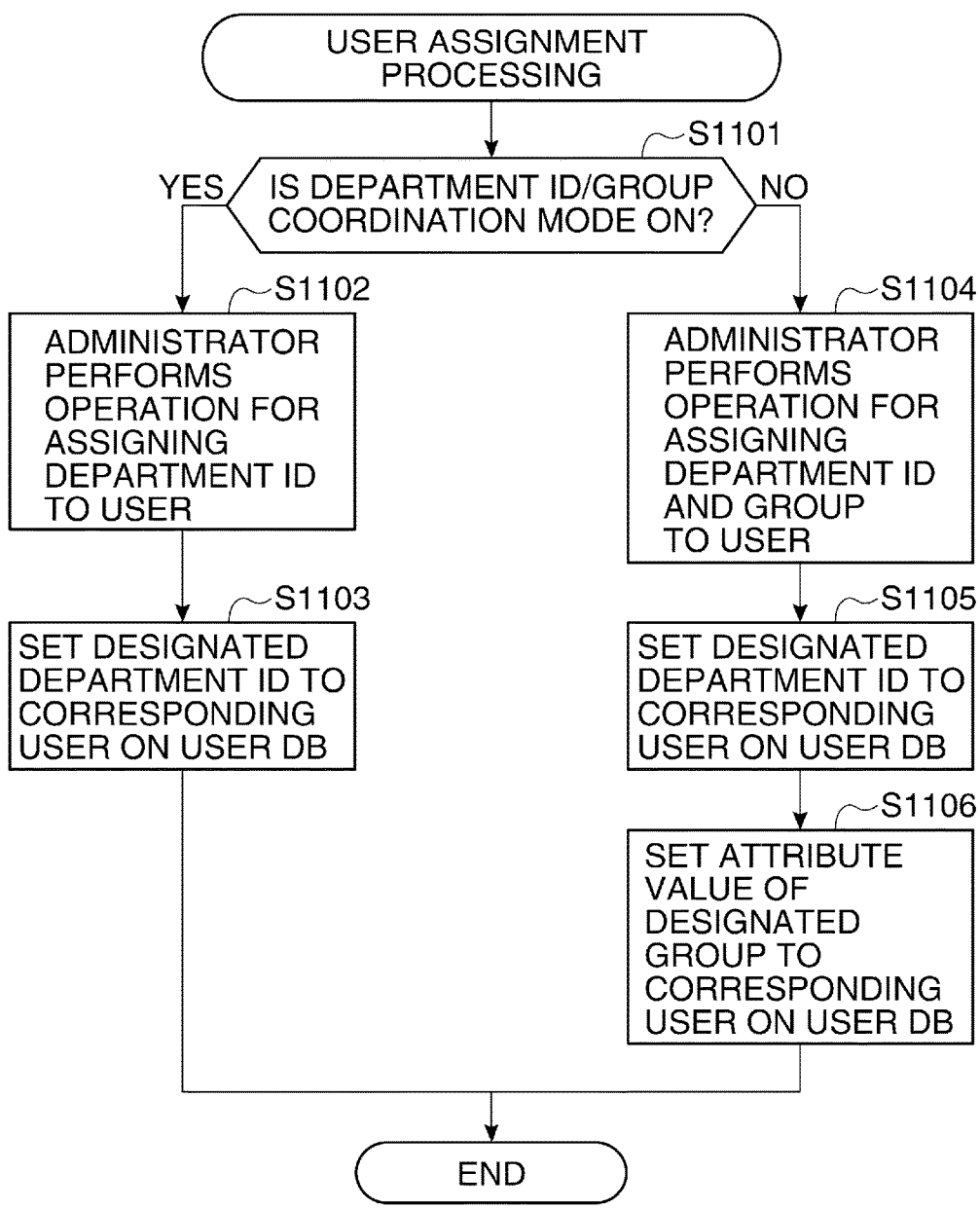
FIG. 12 is a flowchart showing a procedure of user assignment processing executed by the CPU in FIG. 2.

FIG. 12 is a flowchart showing a procedure of user assignment processing executed by the CPU 201 in FIG. 2. This processing is performed for assigning a department ID and a group to the user.

In FIG. 12, the CPU 201 judges whether or not the stored department/group coordination mode setting 315 is ON with reference to the mode setting area 309 (step S1101). As a result of the judgment in step S1101, if the department/group coordination mode setting 315 is ON (Yes in step S1101), the administrator performs operation of assigning a department ID to the user (step S1102).

Next, the CPU 201 sets the department ID assigned through the operation by the administrator at the department ID in the record of the user in the user DB 307 by the user information setting unit 306 (step S1103) and ends the processing.

Meanwhile, as a result of the judgment in step S1101, if the department/group coordination mode setting 315 is OFF (No in step S1101), the administrator performs operation of assigning a department ID and a group to the user (step S1104).

Next, the CPU 201 sets the department ID assigned through the operation by the administrator at the department ID in the record of the user in the user DB 307 by the user information setting unit 306 (step S1105), further, sets an attribute value of the group designated through the operation by the administrator at the attribute value in the record of the user in the user DB 307 (step S1106) and ends the processing.

Figure 13:
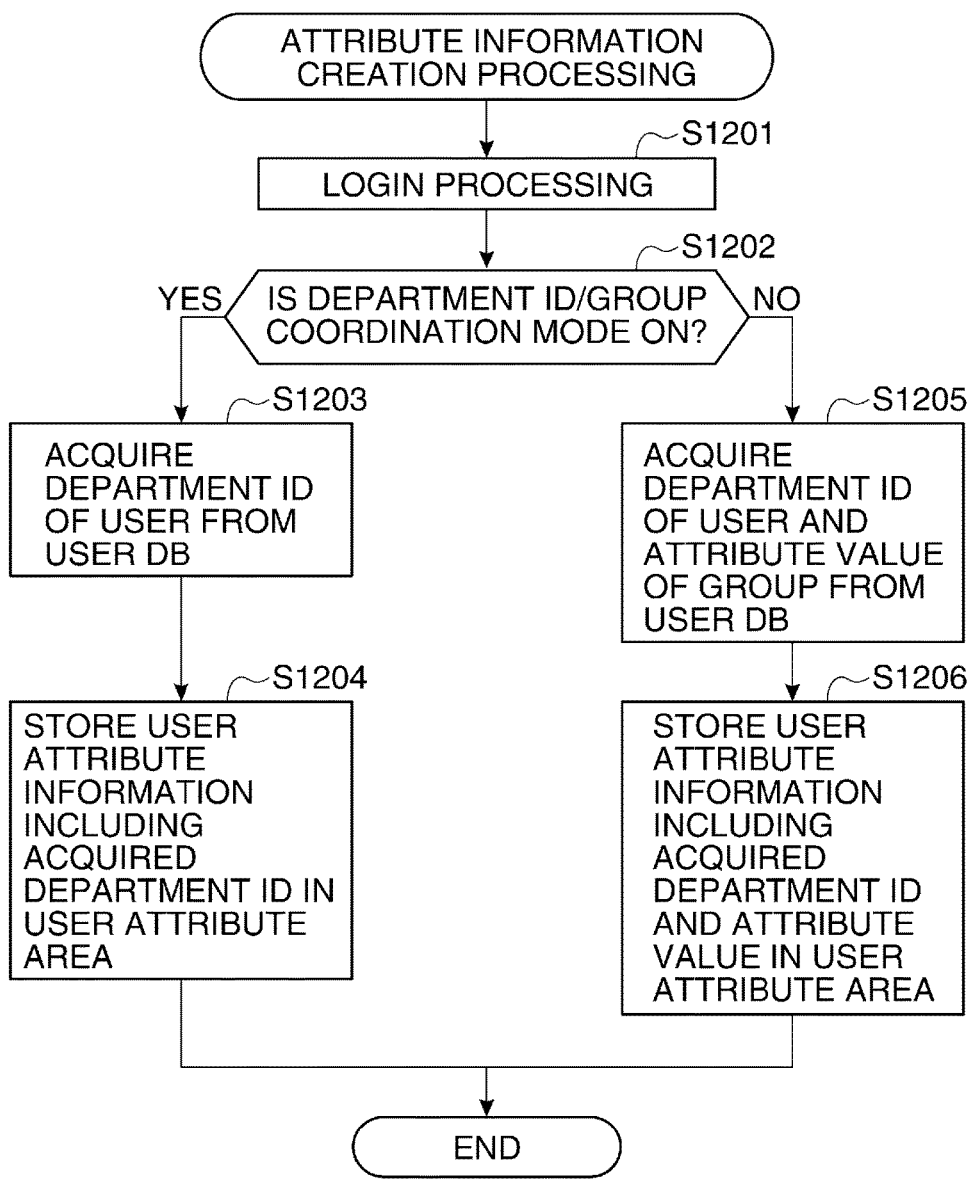
FIG. 13 is a flowchart showing a procedure of attribute information creation processing executed by the CPU in FIG. 2.

FIG. 13 is a flowchart showing a procedure of attribute information creation processing executed by the CPU 201 in FIG. 2. This processing is performed for creating the user attribute information 316 stored in the user attribute area 312 when the user performs login.

In FIG. 13, the CPU 201 performs user login processing by the login unit 310 (step S1201), and judges whether or not the stored department/group coordination mode setting 315 is ON with reference to the mode setting area 309 (step S1202).

As a result of the judgment in step S1202, if the department/group coordination mode setting 315 is ON (Yes in step S1202), the CPU 201 acquires a department ID of the user who has performed login from the user DB 307 by the user attribute determining unit 311 (step S1203).

Subsequently, the CPU 201 sets the acquired department ID at the user attribute information 316 and stores the user attribute information 316 in the user attribute area 312 (step S1204) and ends the processing. In this way, in the present embodiment, in the user attribute information 316 created when the user logs into the MFP 101, the department ID of the department to which the user belongs is set at the group to which the user belongs.

In the user attribute information 316 stored in this way, the department ID matches the attribute value as shown in FIG. 4C.

Meanwhile, as a result of the judgment in step S1202, if the department/group coordination mode setting 315 is OFF (No in step S1202), the CPU 201 acquires the department ID and the attribute value of the group of the user who has performed login from the user DB 307 by the user attribute determining unit 311.

Subsequently, the CPU 201 sets the acquired department ID and attribute value at the user attribute information 316, stores the user attribute information 316 in the user attribute area 312 (step S1206) and ends the processing.

In the user attribute information 316 stored in this way, the department ID is different from the attribute value as shown in FIG. 3E.

As described above, according to the present embodiment, if the department ID is created (step S901), a record having the created department ID is added to the department database (step S902), and a record having the created department ID as the group name is added to the group database (step S904). By this means, it is possible to automatically set the group database in conjunction with the setting work of the department database, which eliminates the need of setting work of the group database, so that it is possible to reduce the amount of setting work of the administrator.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-243754, filed Nov. 26, 2013, which is hereby incorporated by reference herein in its entirety.

What is claimed is:
1. An image forming apparatus comprising:
a storage device that stores
a first group database configured to register first group IDs indicating first groups, each of the first group IDs being related to the number of sheets printed by the image forming apparatus,
a second group database configured to register second group IDs indicating second groups, each of the second group IDs being related to an address book,
a user database configured to register user IDs indicating users, each of the user IDs having one of the first group IDs and one of the second group IDs;
a memory device that stores a set of instructions; and
at least one processor that executes the set of instructions to:
register, in the second group database, in an ON state of the first group database and the second group database coordination mode, a new second group ID which corresponds to a new first group ID registered by an administrator in the first group database;
set, in a case where a user logs into the image forming apparatus, a value of an item representing the second group ID to which the user belongs, to a value corresponding to the first group ID to which the user belongs; and control a display to display, based on the second group database, an address book corresponding to a second group to which the user belongs in accordance with a request to display the address book by the user, wherein, in an OFF state of the first group database and the second group database coordination mode, an addition or a deletion of a record in the first group database is not reflected on the second group database, and wherein, the at least one processor executes the set of instructions to:

in an ON state of the first group database and the second group database coordination mode, in a case where one of the first group IDs is deleted in the first group database, delete, in the second group database, one of the second group IDs corresponding to the deleted one of the first group IDs, in response to the one of the first group IDs being deleted.

2. The image forming apparatus according to claim 1, wherein in a case where the new first group ID is registered by the administrator in the user database as a first group ID of a user when operating in the ON state of the first group database and the second group database coordination mode, a new attribute value same as the new first group ID is registered in the user database as a new second group name of a group to which the user belongs.

3. A control method for an image forming apparatus, comprising:

a first registering step of registering, in a first group database, first group IDs indicating first groups, each of the first group IDs being related to the number of sheets printed by the image forming apparatus;

a second registering step of registering, in a second group database, second group IDs indicating second groups, each of the second group IDs being related to an address book;

a third registering step of registering, in a user database, user IDs indicating users, each of the user IDs having one of the first group IDs and one of the second group IDs; and a fourth registering step of registering, in the second group database, in an ON state of the first group database and the second group database coordination mode, a new second group ID which corresponds to a new first group ID registered by an administrator in the first group database;

a setting step of setting, in a case where a user logs into the image forming apparatus, a value of an item representing the second group ID to which the user belongs, to a value corresponding to the first group ID to which the user belongs; and a display step of causing to be displayed on a display, based on the second group database, an address book corresponding to a second group to which the user belongs in accordance with a request to display the address book by the user, wherein, in an OFF state of the first group database and the second group database coordination mode, an addition or a deletion of a record in the first group database is not reflected on the second group database, wherein, in an ON state of the first group database and the second group database coordination mode, in a case where one of the first group IDs is deleted in the first group database, delete, in the second group database, one of the second group IDs corresponding to the deleted one of the first group IDs, in response to the one of the first group IDs being deleted.

4. A non-transitory computer-readable storage medium storing a program for causing a computer to execute a control method for an image forming apparatus, the control method comprising:

a first registering step of registering, in a first group database, first group IDs indicating first groups, each of the first group IDs being related to the number of sheets printed by the image forming apparatus;

a second registering step of registering, in a second group database, second group IDs indicating second groups, each of the second group IDs being related to an address book;

a third registering step of registering, in a user database, user IDs indicating users, each of the user IDs having one of the first group IDs and one of the second group IDs; and a fourth registering step of registering, in the second group database, in an ON state of the first group database and the second group database coordination mode, a new second group ID which corresponds to a new first group ID registered by an administrator in the first group database;

a setting step of setting, in a case where a user logs into the image forming apparatus, a value of an item representing the second group ID to which the user belongs, to a value corresponding to the first group ID to which the user belongs; and a display step of causing to be displayed on a display, based on the second group database, an address book corresponding to a second group to which the user belongs in accordance with a request to display the address book by the user, wherein, in an OFF state of the first group database and the second group database coordination mode, an addition or a deletion of a record in the first group database is not reflected on the second group database, wherein, in an ON state of the first group database and the second group database coordination mode, in a case where one of the first group IDs is deleted in the first group database, delete, in the second group database, one of the second group IDs corresponding to the deleted one of the first group IDs, in response to the one of the first group IDs being deleted.

5. An image forming apparatus comprising:

a storage device that stores a department database and a group database, the department database for managing, in association with each other, a department ID that is identification information of a department utilized as a category in an organization and a restriction information associated with the department ID and related to image processing of the image forming apparatus executed by a user, the group data base for managing a group ID that is identification information of a group different from the department and a group name corresponding to the group ID;

a memory device that stores a set of instructions; and at least one processor that executes the set of instructions to:

add a record including a department ID created according to an instruction of an administrator, to the department database;

add, in case where the department ID is created, a record having the created department ID as the group name;

set, according to the instruction of the administrator, a department ID of a department to which the user belongs;

set, in a case where the user logs into the image forming apparatus, a value of an item representing a group to which the user belongs in the group database to a value corresponding to the department ID assigned to the user; and display, in a case where the user performs operation of displaying an address book, the address book corresponding to the group to which the user belongs, wherein the at least one processor executes instructions in the memory device to:

delete, in case where the record is deleted from the department database, the record of the group database having the same group name as the department ID included in the deleted record.

6. The information processing apparatus according to claim 5, wherein the at least one processor executes instructions in the memory device to:

add, in a case where a record having the department ID present in the department DB is not present in the group database, a record having the department ID present in the department database to the group database.

* * * * *